(12) United States Patent
Johne et al.

(10) Patent No.: US 9,165,147 B2
(45) Date of Patent: Oct. 20, 2015

(54) APPARATUS AND METHOD FOR GENERATING DIGITAL IMAGES

(71) Applicant: GIESECKE & DEVRIENT GMBH, Munich (DE)

(72) Inventors: Andreas Johne, Grobenzell (DE); Thomas Delonge, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/364,578

(22) PCT Filed: Dec. 19, 2012

(86) PCT No.: PCT/EP2012/005279
§ 371 (c)(1),
(2) Date: Jun. 11, 2014

(87) PCT Pub. No.: WO2013/091862
PCT Pub. Date: Jun. 27, 2013

(65) Prior Publication Data
US 2014/0321640 A1    Oct. 30, 2014

(30) Foreign Application Priority Data

Dec. 23, 2011 (DE) .......................... 10 2011 122 273

(51) Int. Cl.
  *G06F 21/60* (2013.01)
  *H04N 1/00* (2006.01)
  *H04N 1/32* (2006.01)

(52) U.S. Cl.
  CPC .......... *G06F 21/602* (2013.01); *H04N 1/00339* (2013.01); *H04N 1/32101* (2013.01); *H04N 2201/0041* (2013.01); *H04N 2201/0051* (2013.01); *H04N 2201/3233* (2013.01)

(58) Field of Classification Search
  CPC .............. G06F 21/602; H04L 2209/24; H04L 2209/12; H04L 9/14; H04L 9/0631; H04L 9/0816
  See application file for complete search history.

(56) References Cited

U.S. PATENT DOCUMENTS 6,005,936 A * 12/1999 Shimizu et al. ............... 713/176
7,519,820 B2 * 4/2009 Watanabe et al. ............. 713/176

(Continued)

FOREIGN PATENT DOCUMENTS

DE   10223436 A1   12/2003
WO   0049797 A1    8/2000

(Continued)

OTHER PUBLICATIONS

Dietrich et al.,"Implementation Aspects of Mobile and Embedded Trusted Computing," Trusted Computing, Apr. 6, 2009, pp. 29-44, vol. 5471, Springer Berlin Heidelberg.

(Continued)

*Primary Examiner* — Yonas Bayou
(74) *Attorney, Agent, or Firm* — Workman Nydegger

(57) ABSTRACT

An apparatus and a method are arranged for generating a digital image. The apparatus comprises an image generation unit for generating the digital image having a first security module adapted for cryptographically linking a first secret unambiguously identifying the first security module, and securely deposited therein, with the digital image such that the integrity of the digital image can be ascertained using the result of this cryptographic linkage. Further, the apparatus comprises a portable data carrier which can be introduced into the apparatus. The portable data carrier is furnished with a second security module which is adapted for cryptographically linking a second secret unambiguously identifying the portable data carrier, and securely deposited therein, with the digital image such that the identity of the portable data carrier can be ascertained using the result of this cryptographic linkage.

9 Claims, 1 Drawing Sheet

(56) References Cited

U.S. PATENT DOCUMENTS

| | | | | |
|---|---|---|---|---|
| 7,602,940 | B2* | 10/2009 | Rhoads et al. | 382/100 |
| 8,798,261 | B2* | 8/2014 | Rakic et al. | 380/28 |
| 2003/0177353 | A1* | 9/2003 | Hiltgen | 713/161 |
| 2005/0108540 | A1* | 5/2005 | Kusnoto et al. | 713/176 |
| 2007/0049250 | A1* | 3/2007 | Chambers et al. | 455/411 |
| 2007/0147610 | A1* | 6/2007 | Kethi Reddy | 380/229 |
| 2007/0174632 | A1 | 7/2007 | Ferren et al. | |
| 2009/0138726 | A1* | 5/2009 | Brautigam et al. | 713/189 |
| 2009/0240955 | A1* | 9/2009 | Chow et al. | 713/193 |
| 2010/0023781 | A1 | 1/2010 | Nakamoto | |
| 2013/0236006 | A1* | 9/2013 | Bockes et al. | 380/28 |
| 2014/0286488 | A1* | 9/2014 | Pulkus | 380/28 |
| 2014/0294172 | A1* | 10/2014 | Conway et al. | 379/266.01 |

FOREIGN PATENT DOCUMENTS

| | | | |
|---|---|---|---|
| WO | WO 0049797 A1 * | 8/2000 | |
| WO | 2007139516 A1 | 12/2007 | |

OTHER PUBLICATIONS

German Search Report for corresponding German Application No. 102011122273.5, Sep. 7, 2012.

International Preliminary Report on Patentability for corresponding International PCT Application No. PCT/EP2012/005279, Jun. 24, 2014.

International Search Report for corresponding International PCT Application No. PCT/EP2012/005279, Mar. 19, 2013.

Kuntze et al., "Secure Digital Chains of Evidence," Systematic Approaches to Digital Forensic Engineering (SADFE), 2011 IEEE Sixth International Workshop, May 26, 2011, pp. 1-8.

Winkler et al., "Securing Embedded Smart Cameras with Trusted Computing," EURASIP Journal on Wireless Communications and Networking, Jan. 1, 2011, pp. 35-20, vol. 41, No. 7.

* cited by examiner

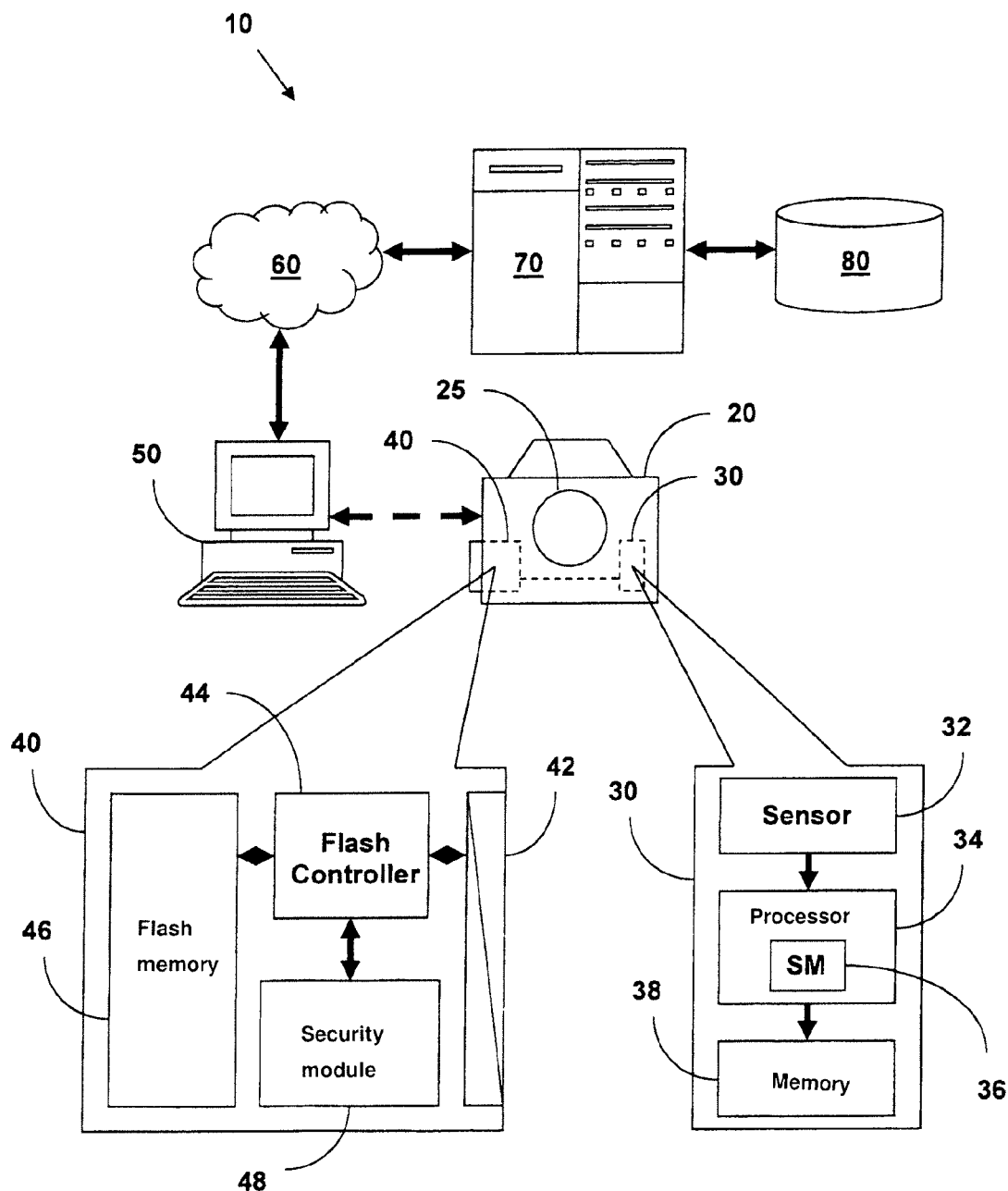

APPARATUS AND METHOD FOR GENERATING DIGITAL IMAGES

BACKGROUND

This invention relates to an apparatus and a method for generating digital images or photographs.

The digital images or photographs generated with a conventional digital camera are normally not safe from subsequent tampering, i.e. it cannot be guaranteed that a digital image has not been subsequently tampered with. In many cases, however, it is required that unambiguous proof can be furnished that a digital image has not been subsequently tampered with, i.e. that its integrity has not been corrupted. Besides the integrity of a digital image, a further important aspect is its authenticity with regard to the photographer as the author, since authenticity with regard to the photographer enables the identity of the author of the digital image, i.e. of the photographer, to be unambiguously established, and this person thus to be identified as the owner of the copyright of a digital image.

Both integrity and authenticity with regard to the photographer as the author of a digital image can be important in particular in the following cases. Digital photographs taken in the course of police investigations or court proceedings can quite generally only be employed as evidence when it is certain that no subsequent changes have been made in the digital photographs. Further, the photographer must normally identify himself accordingly. In structural surveys relating to building measures, digital photographs can be employed for example to document structural damage or prove that work has been performed correctly. In such cases, too, it can be required that both the integrity and the authenticity of the digital photographs can be ascertained or guaranteed. The same holds for the documentation of medical operations by means of digital images or photographs.

The prior art discloses digital cameras which, upon the recording of a digital image, already furnish it with a digital signature and optionally encrypt it in the camera. For this purpose, such a digital camera has corresponding cryptographic keys deposited therein. A background system has accordingly matching cryptographic keys deposited therein, in order to enable a digital image to be decrypted again and the digital signature to be tested.

The publication "Securing Embedded Smart Cameras with Trusted Computing", Thomas Winkler and Bernhard Rinner, EURASIP Journal on Wireless Communications and Networking, Volume 2011, Article ID 530354, describes a video surveillance system having a multiplicity of surveillance cameras, wherein the integrity of video data recorded with the video surveillance system, and their authenticity with regard to a surveillance camera employed therefor, are guaranteed by the surveillance cameras of the video surveillance system being respectively equipped with a security chip or security module in the form of a Trusted Platform Module (TPM).

SUMMARY

Although the hereinabove described known solutions enable a certain security standard when generating a digital image, they are not suitable for guaranteeing both the integrity of digital images and their authenticity with regard to the photographer as the author with a sufficient security standard.

Against this background, the present invention is based on the object of providing an improved apparatus and an improved method for generating a digital image wherein both the integrity of the digital image and its authenticity with regard to the photographer as the author of the digital image can be guaranteed with a sufficient security standard.

The invention is based in particular on the fundamental idea of furnishing an apparatus for generating a digital image, in particular a digital camera, having a first security module preferably built into the apparatus and guaranteeing the integrity of the digital image upon the generation thereof, on the one hand, and having a second security module which is made available on a portable data carrier which for generating the digital image can be connected to the apparatus, said second module guaranteeing the authenticity of the digital image with regard to the photographer as the author upon the generation thereof, on the other hand.

In accordance with this fundamental idea, there is made available according to a first aspect of the invention an apparatus for generating a digital image. The apparatus comprises an image generation unit for generating the digital image having a first security module. The first security module is adapted for cryptographically linking a first secret unambiguously identifying the first security module, and securely deposited therein, with the digital image such that the integrity of the digital image can be ascertained using the result of this cryptographic linkage. The apparatus for generating a digital image further comprises a portable data carrier which can be introduced into the apparatus. The portable data carrier is furnished with a second security module which is adapted for cryptographically linking a second secret unambiguously identifying the portable data carrier, and securely deposited therein, with the digital image such that the identity of the portable data carrier can be unambiguously ascertained using the result of this cryptographic linkage.

According to a further aspect of the invention, there is made available a corresponding method for generating a digital image. Such method comprises the following steps: generating a digital image by means of an image generation unit of an apparatus for generating a digital image; cryptographically linking the digital image with a first secret which is securely deposited in a first security module which is part of the image generation unit, and which unambiguously identifies the first security module, wherein the integrity of the digital image can be ascertained using the result of this cryptographic linkage; and cryptographically linking the digital image with a second secret which is securely deposited in a second security module which is part of a portable data carrier which can be introduced into the apparatus for generating a digital image, and which unambiguously identifies the second security module, wherein the identity of the portable data carrier can be unambiguously ascertained using the result of this cryptographic linkage.

Preferably, the image generation unit of the apparatus for generating a digital image comprises a sensor unit for processing the optical signals captured by the apparatus into digital raw data, and a processor unit for processing the digital raw data into the digital image. The first security module is preferably adapted here as part of the processor unit. Alternatively, the first security module can be a component separate from the processor unit. According to a further alternative, the functions of the processor unit can be integrated into the first security module, so that the processor unit is made available by the first security module in this case.

The first and the second security module (also known as a Secure Element to the person skilled in the art) can respectively be adapted as hardware in the form of a security controller or smart-card controller or as a Trusted Platform Module (TPM).

Alternatively, the first and/or the second security module can be adapted as software in the form of a TrustZone. In this preferred embodiment, the processor unit of the image generation unit can for example have implemented therein a normal runtime environment and a secure, trustworthy runtime environment. The secure runtime environment is isolated from the normal runtime environment here and serves for executing security-critical applications. A preferred example of a secure runtime environment is the ARM® TrustZone® known from the prior art. This TrustZone has running therein a separate secure or hardened operating system, preferably the likewise known operating system MobiCore®.

Preferably, besides the second security module, e.g. in the form of a security controller, the portable data carrier has a mass storage device on which the generated digital image can be stored. In this preferred embodiment, the portable data carrier is a memory card on which the second security module is implemented and which can be inserted into a corresponding card slot of the apparatus for generating a digital image. Preferably, besides the second security module and the mass storage device, e.g. a flash memory, the memory card comprises a memory controller for managing the mass storage device. The second security module can be adapted for storing the digital image on the mass storage device of the memory card in encrypted form on the basis of a cryptographic key deposited in the second security module. The memory card may be e.g. an SD card, an SDHC card, an SDXC card, a miniSD card, a microSD card, or the like.

According to a preferred embodiment, the first secret which is securely deposited in the first security module of the image generation unit is a first signature key which is cryptographically linked by the first security module with the digital image in the form of a first digital signature. Alternatively, the first secret can be a MAC key which is cryptographically linked by the first security module with the digital image by determining a MAC (Message Authentication Code) of the digital image by means of the MAC key.

In the same way, the second secret which is securely deposited in the second security module is preferably a second signature key which is cryptographically linked with the digital image in the form of a second digital signature. Alternatively, the second secret may likewise be a MAC key which is cryptographically linked with the digital image by determining a MAC (Message Authentication Code) of the digital image by means of the MAC key.

The apparatus for generating a digital image may be a digital camera, a mobile radio device having a digital camera, or a digital video camera. Likewise, the apparatus for generating a digital image may be a scanner, a copier, and/or a printer.

In the preferred embodiment, in which the apparatus for generating a digital image may be a mobile telephone having a digital camera, the first security module adapted as a security controller may be a SIM card, USIM card or a security controller embedded in the mobile telephone electronics.

The first security module of the processor unit can further be adapted for furnishing the digital image with a digital watermark. This may be a visible and/or a non-visible digital watermark.

According to a preferred embodiment, the first security module and/or the second security module can communicate with a background system in the form of a central key management server. Preferably, the central key management server is operated by a Trusted Service Manager (TSM).

As the person skilled in the art will appreciate, the hereinabove described preferred embodiments can be advantageously implemented within the framework of the first aspect of the invention, i.e. within the framework of an apparatus for generating a digital image, as well as within the framework of the second aspect of the invention, i.e. within the framework of a method for generating a digital image.

Compared with the prior art, the invention has in particular the following advantages. Upon the generation of digital images there is employed not only a secret securely deposited on the digital camera, but additionally a secret securely deposited on a portable data carrier, which unambiguously identifies the portable data carrier or the photographer. Upon the later verification of a digital image it can then be ascertained that the digital image has been recorded by means of a secure digital camera, on the one hand, and that the digital image can be unambiguously associated with a photographer, on the other hand. The digital image can be deposited on the portable data carrier in encrypted form.

BRIEF DESCRIPTION OF THE DRAWINGS

Further features, advantages and objects of the invention can be found in the following detailed description of several exemplary embodiments and alternative embodiments in connection with the FIGURE hereinafter:

FIG. 1 shows a schematic representation of a system having a preferred embodiment of an apparatus for generating a digital image in the form of a digital camera.

DETAILED DESCRIPTION OF VARIOUS EMBODIMENTS

The essential element of the system 10 for generating a digital image as schematically represented in FIG. 1 is the apparatus for generating a digital image in the form of a digital camera 20. Besides the usual constituents of conventional digital cameras, such as for example an optical unit 25 in the form of an objective, the digital camera 20 comprises an image generation unit 30 which is adapted for generating a digital image from the optical signals impinging on the objective 25 of the digital camera 20. For this purpose, the image generation unit 30 has an image-producing optical sensor unit 32, which may be for example a CCD sensor or a CMOS sensor. As is known to the person skilled in the art, such a CCD sensor or CMOS sensor converts the optical signals imaged thereon by means of the objective 25 into corresponding electrical signals.

The electrical signals or raw data generated by the optical sensor unit 32 can be read out by a processor unit 34 of the image generation unit 30, whereby an A/D converter might further be provided for converting the electrical signals generated by the optical sensor unit 32 into digital raw data. The processor unit 34 is preferably an image processing processor which is adapted in particular for suitably processing the raw data generated by the optical sensor unit 32. For example, the processor unit 34 in the form of an image processing processor can be adapted for carrying out the following image processing steps: noise reduction, white balance, focusing, contrast adjustment, gamma correction, correction of chromatic aberration, adjustment to a color space, data compression with conversion to a suitable image data format (e.g. JPEG), and the like. Although such image processing steps, strictly speaking, already change the image captured by the optical sensor unit 32, these image processing steps are not to be understood as that unwanted tampering with a digital image that is to be detected with the present invention. For example, a JPEG version that the processor unit 34 creates for a digital image is understood according to the present invention to be the image captured by the optical sensor unit 32. To be able to track the "permissible" image processing steps or changes of a digital image that are performed by the processor unit 34, however, the image processing steps performed by the processor unit 34, e.g. the employed correction values, are preferably logged. This information can be stored together with the digital image generated by the processor unit 34 or separately therefrom, e.g. in a memory unit 38 of the image generation unit 30, said memory unit being connected to the processor unit 34. According to the invention it is likewise imaginable, however, that the digital raw data made available by the optical sensor unit 32 (and possibly an A/D converter) are not processed further, but are stored in the memory unit 38 directly as digital raw data.

Besides the components described hereinabove and represented in FIG. 1, the image generation unit 30 comprises a security module 36, which is also known as a Secure Element to the person skilled in the art. According to a preferred embodiment, the security module 36 is adapted as a security controller, which is also known as a Trusted Platform Module (TPM) to the person skilled in the art. Such a security controller, which is also known as a chip-card or smart-card controller to the person skilled in the art in particular from the area of chip cards, preferably has its own processor unit and its own memory unit which preferably cannot be accessed from outside the security controller. The security module 34 preferably adapted as a security controller can, as represented in FIG. 1, be part of the processor unit 34 or be configured as a separate element. According to a further alternative embodiment, the whole processor unit 34 can also be adapted as a security controller. In this case, the hereinabove described image processing steps, such as for example a noise reduction or a data compression, would also be carried out by the security controller.

The security module 36, preferably adapted as a security controller, of the image generation unit 30 is adapted in particular for furnishing the digital image made available by the optical sensor unit 32, and possibly processed by the processor unit 34, with a digital signature. For creating such a digital signature, there is preferably deposited in the secure memory unit of the security module 36 adapted as a security controller a first secret in the form of a first signature key, which unambiguously identifies the security module 36 adapted as a security controller, or the digital camera 20. In the embodiment represented in FIG. 1, wherein the security module 36 adapted as a security controller is configured separately from the processor unit, the processor unit 34 and the security module 36 adapted as a security controller are preferably adapted such that, for creating the signature of a digital image, the corresponding data are delivered from the processor unit 34 to the security module 36 adapted as a security controller, said data are signed there with the first signature key deposited in the secure memory unit, and the signed digital image is delivered to the processor unit 34 again, so that the first signature key always remains in the secure environment of the security module 36 adapted as a security controller. As described hereinabove, the digital signature can likewise incorporate the image processing steps to which the digital image has been subjected in the processor unit 34. It is likewise conceivable that both the raw data of a digital image and the processed digital image are furnished with a digital signature. The person skilled in the art will further appreciate that, instead of a digital signature, there can for example also be employed a MAC (Message Authentication Code) with a corresponding key.

Besides the hereinabove described creation of a digital signature, the security module 36 preferably adapted as a security controller can further be arranged for encrypting a digital image. The encryption of a digital image offers the advantage that only an authorized recipient can decrypt the encrypted digital image, look at it and later process it further. Thus, a photographer can for example transmit his encrypted digital images to a recipient, e.g. an editorial office, also via insecure data networks without third parties having access to the digital images. This frequently happens today when cameras are coupled to a background system on-line by wireless LAN or radio networks.

Instead of adapting the security module 36 of the image generation unit 30 substantially as hardware in the form of a security controller, it is likewise conceivable according to the invention to adapt the security module 36 of the image generation unit 30 substantially in the form of a software solution implemented on the processor unit 34, which is known to the person skilled in the art from the area of secure mobile telephones and wherein the processor unit 34 has configured therein a normal runtime environment ("Normal Zone") as well as a secure runtime environment ("TrustZone"), preferably in the form of a so-called ARM® TrustZone®. As is known to the person skilled in the art, the ARM® TrustZone® is a system architecture developed by the company ARM®, which makes a "secure", trustworthy region and a "normal", as a rule non-trustworthy region available in a processor unit. In the implementation according to the present invention, it is monitored whether the processor unit 34 of the image generation unit 30 is being operated in the trustworthy or in the non-trustworthy region. Further, a switchover between the trustworthy and the non-trustworthy regions of the processor unit 34 is monitored. The secure runtime environment is isolated from the normal runtime environment and encapsulates security-critical processes, thereby obtaining an efficient protection from attacks of unauthorized third parties.

In the preferred embodiment described here, the TrustZone has running therein a secure or hardened operating system (also known as a Secure Operating System), preferably the operating system MobiCore® known from the prior art. In contrast, the normal runtime environment contains a conventional operating system. In case the apparatus for generating a digital image according to the invention is a mobile telephone, the operating system implemented in the normal runtime environment is a so-called "Rich OS" with an extensive range of functions. The operating system of the mobile telephone may be e.g. Android, Apple iOS, Windows Phone, or the like.

Besides the image generation unit 30, the digital camera 20 comprises a portable data carrier 40. Preferably, the portable data carrier is adapted as a memory card 40 whose form is complementary to the form of a corresponding card slot in the housing of the digital camera 20 and which can thus be introduced into this card slot in the housing of the digital camera 20 and removed therefrom again. When the memory card 40 has been introduced into the digital camera 20, the memory card 40 is connected to the image generation unit 30 of the digital camera 20 via an input/output interface 42. The input/output interface 42 is in turn connected to a memory controller and a mass storage device of the memory card 40. Preferably, the memory controller and the mass storage device of the memory card 40 are adapted as a flash controller 44 and a flash memory 46, respectively. The memory card 40 of the digital camera 30 differs from conventional memory cards that are employed for digital cameras in particular in that the memory card 40 has a security module 48 preferably adapted as a security controller, which is in communication with the flash controller 44. As in the case of the security module 36 of the image generation unit 30 in the form of a security controller, the security module 48 of the memory card 40 may be a security controller known to the person skilled in the art from the area of chip cards. Accordingly, the security module 48 of the memory card 40 in the form of a security controller comprises its own processor unit and its own secure memory unit. A corresponding memory card is sold for example by the company Giesecke & Devrient Secure Flash Solutions under the product name "Mobile Security Card", having a smart-card controller certified according to Common Criteria EAL 5+ installed therein. Besides a flash memory, this "Mobile Security Card" thus contains a security module in the form of a security controller and can thus make available functions of a conventional smart card or chip card, in particular the digital signing of data, the encryption of data and/or authentication functions. The security controller can be operated for example with the operating system "Java Card".

Preferably, the secure memory area of the security module 48, configured as a security controller, of the memory card 40 has securely deposited therein at least a second secret in the form of a second signature key for generating a digital signature of a digital image, with the second signature key unambiguously identifying the security module 48 adapted as a security controller. Besides the second signature key, the security module 48 adapted as a security controller can have securely deposited thereon further secrets or data which unambiguously identify the portable data carrier 40 or the photographer, as well as cryptographic keys for example for encrypting a digital image.

As described hereinabove, the memory card 40 is connected via its input/output interface 42 to the image generation unit 30 of the digital camera 20 when the memory card 40 has been inserted into a corresponding card slot of the digital camera 20. The digital camera 20 is now preferably adapted such that a digital image deposited in the memory 38 of the image generation unit 30, and having been digitally signed by means of the security module 36 and the first signature key deposited therein, can be delivered to the security module 48 of the memory card 40. The intermediate storage in the memory 38 can of course also be omitted, so that the signed digital image is delivered directly to the security module 48 of the memory card 40. There, the digital image already signed by the security module 36 adapted as a security controller can additionally be digitally signed by the security module 48 of the memory card 40. Preferably, this creation of a further digital signature incorporates the second signature key deposited in the secure memory unit of the security module 48, said key unambiguously identifying the memory card 40 or the photographer. The image thus digitally signed by the security module 36 of the image generation unit 30 and by the security module 48 of the memory card 40 can then be stored in the flash memory 46 of the memory card 40. The person skilled in the art will appreciate that the second signature key employed for the hereinabove described digital signature by the security module 48 of the memory card 40 is also employed only within the security module 48. As in the case of the security module 36, the security module 48 can also be additionally adapted for encrypting the digital image that it has furnished with a digital signature, in order to keep the encrypted digital image in the flash memory 46 of the memory card 40.

In an alternative embodiment, however, it is imaginable that the second signature key can be transferred from the secure memory area of the security module 48, adapted as a security controller, of the memory card 40 to the security module 36 of the image generation unit 30 of the digital camera 20. Preferably, the second signature key is transferred to the security module 36, adapted as a security controller, of the image generation unit 30 of the digital camera 20 in encrypted form. In this alternative embodiment, it is thus conceivable that there is employed for the digital signature of the digital image, generated by the security module 36, both a first secret deposited in the secure memory area of the security module 36 (preferably the first signature key) and a second secret deposited in the secure memory area of the security module 48 (preferably the second signature key). Thus, the doubly signed digital image is marked as authentic by the first signature key specific to the digital camera 20, and additionally correlated with the photographer by the second signature key specific to the photographer or the memory card 40.

As is known to the person skilled in the art, there is normally employed for creating a digital signature the secret private key of a key pair which further comprises a public key. Accordingly, the first signature key deposited in the secure memory area of the security module 36 is preferably a first private key, and the second signature key deposited in the secure memory area of the security module 48 is preferably a second private key. The person skilled in the art is aware that it can be advantageous in particular in the case of relatively large amounts of data to sign the hash value of the digital image and attach the signature to the digital image, instead of signing the image itself.

For testing the digital signatures of a digital image deposited for example in the flash memory 46 of the memory card 40, a first public key which forms a first key pair together with the private first signature key deposited in the secure memory area of the security module 36, and a second public key which forms a second key pair together with the private second signature key deposited in the secure memory area of the security module 48, are applied to the doubly digitally signed digital image. As is known to the person skilled in the art, the order of applying the first and second public keys to the doubly signed digital image should be the reverse of the order of applying the first and second signature keys.

The test of the digital signatures of a digital image deposited for example in the flash memory 46 of the memory card 40 can be carried out for example on a personal computer 50. As is indicated by a dashed double arrow in FIG. 1, the digital camera 20 is preferably adapted for entering into communication with the personal computer 50. It is conceivable for example that the digital camera 20 for this purpose has a USB port which can be connected to a USB port of the personal computer 50 via a corresponding cable, in order to transfer for example a digital image doubly digitally signed as described hereinabove from the flash memory 46 of the memory card 40 to the personal computer 50. Alternatively, the personal computer 50 can have an accordingly shaped card slot into which the memory card 40 can be introduced, in order for the personal computer 50 to have access to the digital images deposited in the flash memory 46 of the memory card 40.

The personal computer 50 is preferably connected via the Internet 60 to a background system in the form of a key management server 70, which, as will be described hereinafter in detail, is preferably adapted as a central key management entity. For storing relatively large amounts of data, the key management server 70 can be connected to a database 80, which could of course also be part of the key management server 70, however. Preferably, the key management server 70 has deposited thereon the first public key, which forms a first asymmetric key pair with the private first signature key deposited in the security module 36 of the image generation unit 30, and the second public key, which forms a second asymmetric key pair with the private second signature key deposited in the security module 48 of the memory card 40. Since a multiplicity of public keys will normally be deposited on the key management server 70, there is transferred to the personal computer 50, together with the doubly signed digital image, information that enables an unambiguous identification both of the memory card 40 and of the digital camera 20, in order to be able to query the corresponding public keys from the key management server 70 using this information.

In the embodiment wherein the second signature key is preferably transferred from the security module 48 of the memory card 40 to the security module 36 of the image generation unit 30 in encrypted form, it is preferably provided that the second signature key transferred to the security module 36 of the image generation unit 30 is deleted there as soon as the corresponding memory card 40 is removed from the card slot of the digital camera 20.

According to a preferred embodiment of the invention, it is provided that upon the manufacture of the processor unit 34 its security module 36 is furnished with a unique identification element, for example a serial number. This unique identification element can be employed for generating the first signature key. A corresponding identification element for generating the second signature key can be deposited on the security module 48 of the memory card 40 upon the manufacture of the memory card 40. Both the identification element of the security module 36 and the identification element of the security module 48 can be deposited on the key management server 70. Using these identification elements, the key management server 70 is able to verify the double digital signature of a digital image, on the one hand, and to generate a key set for secure communication between the security module 36 and the security module 48, on the other hand. The keys are preferably so generated for the one security module that they form a kind of closed system with the keys for the other security module. It can thereby be ensured that the photographer's keys deposited on the memory card 40 can only be transferred to an accordingly equipped digital camera 20.

Thus, the key management server 70 preferably takes effect both upon the manufacture and upon the image check. Every digital camera 20 and/or every memory card 40 are logically linked with the key management server 70 cryptographically during the manufacturing process. This procedure is known as personalization to the person skilled in the art from the area of chip cards.

To avoid the digital camera 20 being utilizable by a third party when a memory card 40 has been lost or forgotten, it is preferably provided that, for utilizing the memory card 40, the photographer must authenticate himself to the security module 48 of the memory card 40, for example by inputting a PIN. If an incorrect PIN is inputted three times in a row, the digital camera 20 can either be locked or be operated without the security module 48 of the memory card 40, so that in this case no second digital signature is effected by the security module 48 and thus nothing can be said about the authorship of the thus generated digital image. The PIN query can be effected for example via a display unit of the digital camera 20, which can normally also serve for displaying the captured or generated digital image.

According to a preferred embodiment, in the case of very high security requirements the security module 36 of the image generation unit 30 and the security module 48 of the memory card 40 can respectively have deposited thereon a key of a preferably symmetric key pair. This symmetric key pair can be employed for a mutual authentication, preferably a challenge-response authentication, between the security module 36 of the image generation unit 30 and the security module 48 of the memory card 40, on the one hand, and for forming a secure, i.e. encrypted, communication channel between the security module 36 of the image generation unit 30 and the security module 48 of the memory card 40, on the other hand. For this purpose, the symmetric keys respectively deposited in the security module 36 of the image generation unit 30 and the security module 48 of the memory card 40 can be employed as master keys from which session keys are respectively derived.

As is known to the person skilled in the art, for authenticating the memory card 40 to the digital camera 20, the security module 36 of the image generation unit 30 can transmit a challenge for example in the form of a random number to the security module 48 of the memory card 40, which is subsequently encrypted according to an agreed encryption algorithm by the security module 48 of the memory card 40 while employing an authentication key deposited there, and the result of this encryption is transferred to the security module 36 of the image generation unit 30 again. With the security module 36 of the image generation unit 30 the procedure is analogous, i.e. the random number transmitted by the security module 36 of the image generation unit 30 to the security module 48 of the memory card 40 is encrypted by means of a corresponding authentication key deposited in the security module 36, and it is tested whether the result of this encryption is equal to the encrypted random number transmitted by the security module 48 of the memory card 40. If this is the case, the security module 34 of the image generation unit 30 can assume that the authentication key deposited in the security module 48 of the memory card 40 is equal to the authentication key deposited in the security module 36 of the image generation unit 30, and thus the memory card 40 is authentic. As is known to the person skilled in the art, an authentication of the digital camera 20 to the memory card 40 can be carried out in a corresponding manner.

As the person skilled in the art will appreciate, in the hereinabove described challenge-response authentication it must be ensured that the security module 36 of the image generation unit 30 and the security module 48 of the memory card 40 employ the same method for respectively calculating the encrypted random number. In particular, the security module 36 of the image generation unit 30 and the security module 48 of the memory card 40 must employ the same crypto-algorithm for encryption.

Although the apparatus for generating a digital image is adapted as a digital camera or as a mobile telephone having a digital camera in the hereinabove described preferred embodiments, the person skilled in the art will appreciate that the invention can be applied to a multiplicity of other apparatuses in which a digital image is generated, such as for example scanners, printers and copiers.

The invention claimed is:

1. An apparatus for generating a digital image, wherein the apparatus comprises:

an image generation unit for generating the digital image having a first security module which is adapted for cryptographically linking a first secret unambiguously identifying the first security module, and securely deposited therein, with the digital image such that the integrity of the digital image can be ascertained using the result of this first cryptographic linkage, the image generation unit comprising a processor unit that has implemented therein a normal runtime environment and a secure, trustworthy runtime environment, wherein the secure runtime environment is isolated from the normal runtime environment and serves for executing security-critical applications; and a portable data carrier which can be introduced into the apparatus, wherein the portable data carrier is furnished with a second security module which is adapted for cryptographically linking a second, different secret unambiguously identifying the portable data carrier, and securely deposited therein, with the digital image such that the identity of the portable data carrier can be ascertained using the result of this second cryptographic linkage, the digital image being signed using both the first and second cryptographic linkages to form a doubly signed digital image, wherein the integrity of the digital image and the identity of the portable data carrier are both identifiable using the doubly signed digital image.

2. The apparatus according to claim 1, wherein the first and/or second security module is adapted as hardware in the form of a security controller or smart-card controller or as a Trusted Platform Module and/or as software in the form of a TrustZone.

3. The apparatus according to claim 1, wherein the image generation unit comprises a sensor unit for processing the optical signals captured by the apparatus into digital raw data, and the processor unit for processing the digital raw data into the digital image, wherein the first security module is adapted as part of the processor unit, the first security module is adapted as a component separate from the processor unit, or the processor unit is made available by the first security module.

4. The apparatus according to claim 1, wherein the first secret which is securely deposited in the first security module of the image generation unit is a first signature key which is cryptographically linked by the first security module with the digital image in the form of a first digital signature, or is a MAC (Message Authentication Code) key which is cryptographically linked by the first security module with the digital image by determining a MAC (Message Authentication Code) of the digital image by means of the MAC (Message Authentication Code) key.

5. The apparatus according to claim 1, wherein the second secret which is securely deposited in the second security module of the portable data carrier is a second signature key which is cryptographically linked with the digital image in the form of a second digital signature, or is a MAC (Message Authentication Code) key which is cryptographically linked with the digital image by determining a MAC (Message Authentication Code) of the digital image by means of the MAC (Message Authentication Code) key.

6. The apparatus according to claim 1, wherein the portable data carrier has, besides the second security module, a mass storage device on which the generated digital image can be stored, wherein the portable data carrier is preferably a memory card.

7. The apparatus according to claim 1, wherein the apparatus for generating a digital image is a digital camera, a mobile telephone having a digital camera, a digital video camera, a scanner, a copier or a printer.

8. The apparatus according to claim 1, wherein the first security module and/or the second security module can communicate with a background system in the form of a central key management server which is operated by a Trusted Service Manager (TSM).

9. A method for generating a digital image, wherein the method comprises the following steps:
generating a digital image by means of an image generation unit of an apparatus for generating a digital image, the image generation unit comprising a processor unit that has implemented therein a normal runtime environment and a secure, trustworthy runtime environment, wherein the secure runtime environment is isolated from the normal runtime environment and serves for executing security-critical applications;
cryptographically linking the digital image with a first secret which is securely deposited in a first security module which is part of the image generation unit, and unambiguously identifies the first security module, wherein the integrity of the digital image can be ascertained using the result of this first cryptographic linkage; and
cryptographically linking the digital image with a second, different secret which is securely deposited in a second security module which is part of a portable data carrier which can be introduced into the apparatus for generating a digital image, and unambiguously identifies the second security module, wherein the identity of the portable data carrier can be ascertained using the result of this second cryptographic linkage, the digital image being signed using both the first and second cryptographic linkages to form a doubly signed digital image, wherein the integrity of the digital image and the identity of the portable data carrier are both identifiable using the doubly signed digital image.

\* \* \* \* \*